(12) United States Patent
Iwanojko et al.

(10) Patent No.: US 6,877,051 B2
(45) Date of Patent: Apr. 5, 2005

(54) CONSISTENCY CHECKING MECHANISM FOR CONFIGURATION PARAMETERS IN EMBEDDED SYSTEMS

(75) Inventors: Bohdan T. Iwanojko, Gdansk (PL); Krzysztof S. Perycz, Chmielno (PL); Adam Kaminski, Gdansk (PL); Zbigniew Przekop, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 490 days.

(21) Appl. No.: 09/878,431

(22) Filed: Jun. 12, 2001

(65) Prior Publication Data

US 2002/0188778 A1 Dec. 12, 2002

(51) Int. Cl.[7] .............................. G06F 13/00; G06F 5/00
(52) U.S. Cl. .......................... 710/100; 710/104; 706/45
(58) Field of Search ................................. 710/100, 104, 710/105; 709/203, 208, 217, 218, 219, 230; 706/45; 707/10

(56) References Cited

U.S. PATENT DOCUMENTS

| | | | | |
|---|---|---|---|---|
| 4,979,107 A | * | 12/1990 | Advani et al. | 710/100 |
| 5,175,800 A | * | 12/1992 | Galis et al. | 706/45 |
| 6,363,417 B1 | * | 3/2002 | Howard et al. | 709/217 |
| 6,601,086 B1 | * | 7/2003 | Howard et al. | 709/203 |

* cited by examiner

*Primary Examiner*—Khanh Dang
(74) *Attorney, Agent, or Firm*—Joni D. Stutman-Horn (57) ABSTRACT

An arrangement is provided for consistent parameter configuration in an embedded system. A consistent parameter configuration mechanism comprises a management client and a configuration manager. When the management client receives a set of configuration requests, it notifies the configuration manager to start a transaction, during which the configuration manager requests relevant embedded modules to perform parameter configurations according to the configuration requests, to manage hard coded dependencies, and to enforce registered dependencies. Any detected inconsistency during parameter configuration causes the consistent parameter configuration mechanism to undo the parameter configuration.

23 Claims, 7 Drawing Sheets

CONSISTENCY CHECKING MECHANISM FOR CONFIGURATION PARAMETERS IN EMBEDDED SYSTEMS

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to embedded systems. Other aspects of the present invention relate to configuration of embedded systems.

More and more hardware and software products are nowadays developed as embedded systems. They are turn-key products that are often deployed on an "as-is" basis. For example, in networking application domain, various routers are embedded systems. To enable an embedded system to function in different application environments, an embedded system is often built in a modular fashion, as in a flexible and lightweight operating system and services (FLOSS) environment.

An embedded system may comprise a plurality of loosely-coupled modules each of which may be configurable and may perform a specific function. Each individual module in such an embedded system may be configured through a number of configuration parameters. Different modules may also be configured to work together through configuration parameters. In a FLOSS environment, modules depend on each other to some extent. The dependency may be defined with respect to configurable parameters. However, such dependency relationships are preferably defined loosely so that a missing or a malfunctioning piece may cause merely insignificant system performance degradation instead of overall system malfunction.

Configurable parameters in an embedded system may be accessed and configured through setting their values from a management station. Configurable parameters may have their counterparts corresponding to run-time variables used in individual modules. The values of run-time variables associated with the parameters are set according to the values of the corresponding configurable parameters. The run-time behavior of an individual module can be controlled by setting the values of their associated configurable parameters. The collection of such parameters across an embedded system forms a current configuration database that determines the overall behavior of the entire system. Whenever the current configuration database is changed, the corresponding system behavior changes accordingly.

Configurable parameters may relate to each other. Two parameters may relate to each other through a dependency relationship. For instance, the value of one parameter may depend on the value of another parameter (e.g., if parameter A=2, then parameter B=5). When an embedded system is configured, the relationships among different configurable parameters have to remain valid or consistent. That is, the values of configurable parameters need to be set in such a way that the underlying dependency relationships remain consistent. Using the above example, when the value of parameter A is set to 2, the value of parameter B should accordingly be set to 5 in order for the configuration to be consistent.

Traditionally, configuration consistency of an embedded system is enforced through individual modules. For example, if parameter B in module X depends on parameter A in the same module (e.g., A=2, then B=5), module X has the responsibility to change the value of B to 5 whenever the value of parameter A is set to 2. In addition, if parameter C in module Y further depends on parameter B in module X, module X needs to also make sure that module Y has to change the value of C accordingly. Such an operating method imposes many burdens on individual modules, making them less flexible, tightly coupled, less modular, and hard to implement.

BRIEF DESCRIPTION OF THE DRAWINGS

The present invention is further described in terms of exemplary embodiments which will be described in detail with reference to the drawings. These embodiments are non-limiting exemplary embodiments, in which like reference numerals represent similar parts throughout the several views of the drawings, and wherein.

DETAILED DESCRIPTION

The invention is described below, with reference to detailed illustrative embodiments. It will be apparent that the invention to be embodied in a wide variety of forms, some of which may be quite different from those of the disclosed embodiments. Consequently, the specific structural and functional detail is disclosed herein are merely representative and do not limit the scope of the invention.

The processing described below may be performed by a general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
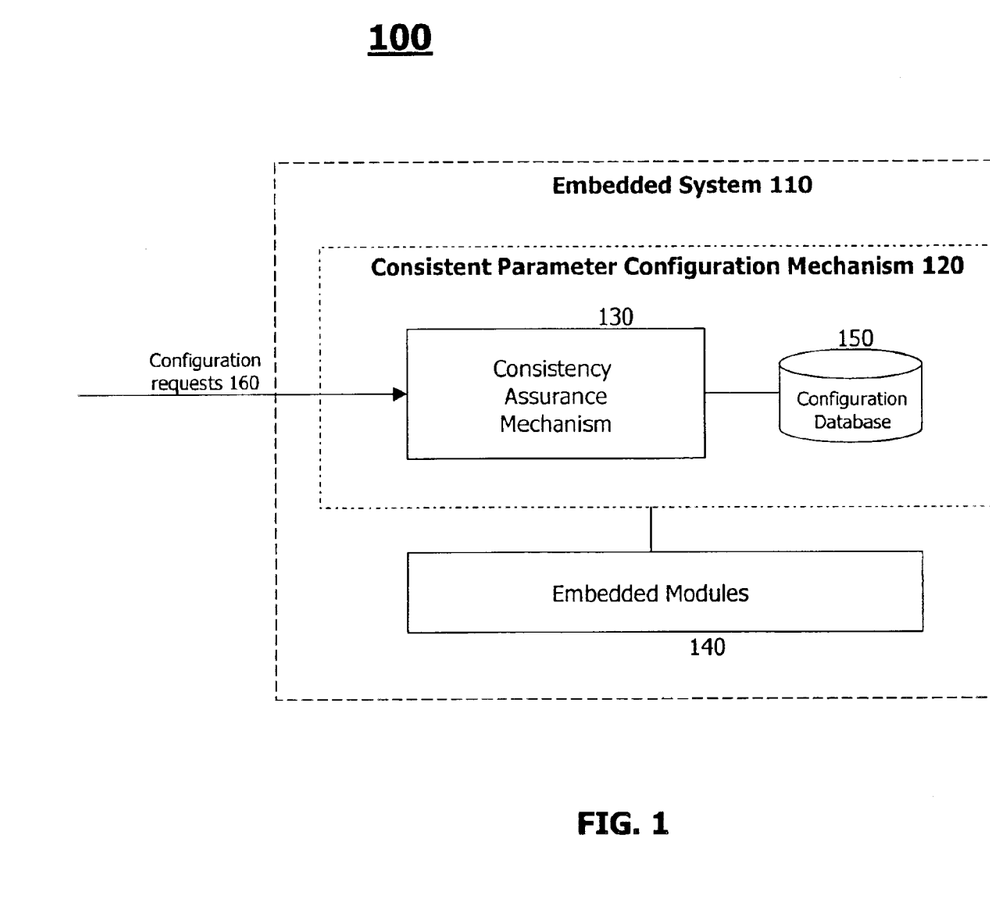
FIG. 1 depicts a high level architecture of embodiments of the present invention and the environment in which it operates.

The present invention addresses automatically establishing consistent configuration parameters in embedded systems. FIG. 1 shows a high-level system architecture 100 of embodiments of the present invention, in which a consistent parameter configuration mechanism ensures the consistency of the configuration parameters across all the embedded modules in an embedded system. In the system architecture 100 shown in FIG. 1, an embedded system 110 has a set of embedded modules 140 and a consistent parameter configuration mechanism 120 that receives a set of configuration requests 160 and that ensures a consistent parameter configuration to be performed on the embedded system 110 according to the set of configuration requests 160. Parameter configuration is controlled by a consistency assurance mechanism 130 and is executed via the embedded modules 140. The resultant consistent parameter configuration is stored in a configuration database 150.

The configuration requests 160 may be sent to the embedded system 110 to request a configuration on the embedded system 110 in a desired way. The configuration may involve setting the values of certain configurable parameters used by the embedded modules. The configuration requests 160 may be sent using some protocol via a network. For example, the Simple Network Management Protocol (SNMP) may be employed to send the configuration requests 160 (SNMP is defined in Request For Comments 1157, Network Working Group, Category: Standard STD0015, March 1991.). Using the SNMP, a client (not shown in FIG. 1) may configure and monitor the embedded system 110 across network.

The embedded modules 140 may represent a set of loosely-coupled modules. Each embedded module may be associated with zero or more configuration parameters. For example, module X may be associated with a configuration parameter A and module Y may be associated with configuration parameters B and C. All the configuration parameters across the entire embedded system 110 form a configuration of the embedded system. That is, a particular set of values of the configuration parameters corresponds to a specific configuration. When the values of the configuration parameters change, the configuration of the embedded system 110 changes. The value of a configuration parameter may be updated from a management station or through the configuration requests 160.

A configuration parameter may have its counterpart in a corresponding embedded module as a run-time variable. Through such run-time variables, configuration parameters determine the behavior of individual embedded modules. The overall configuration of the embedded system 110 specifies the overall run-time behavior of the embedded system 110. In the illustrated embodiments shown in FIG. 1, an overall configuration for the embedded system 110 is stored in the configuration database 150. Whenever the configuration is updated, the updated configuration (or current configuration) replaces the originally saved configuration in 150.

At anytime, the configuration of the embedded system 110 remains consistent. In the present invention, the consistency of the configuration is ensured by the consistent parameter configuration mechanism 120. The consistency may be defined prior to parameter configuration and may be specified as having valid values with respect to various dependency relationships. Such dependency relationships may include the dependencies among parameters within a single module and the dependencies among parameters in different embedded modules.

In the exemplary embodiments shown in FIG. 1, the consistency assurance mechanism 130 receives the configuration requests 160, executes the requested configurations via the embedded modules 140, and ensures that the configurations performed yield consistent parameter setting across all involved embedded modules before storing the current parameter configuration into the configuration database 150. The configuration database 150 is updated only when the consistency assurance mechanism 130 determines that the configuration is consistent.

Figure 2:
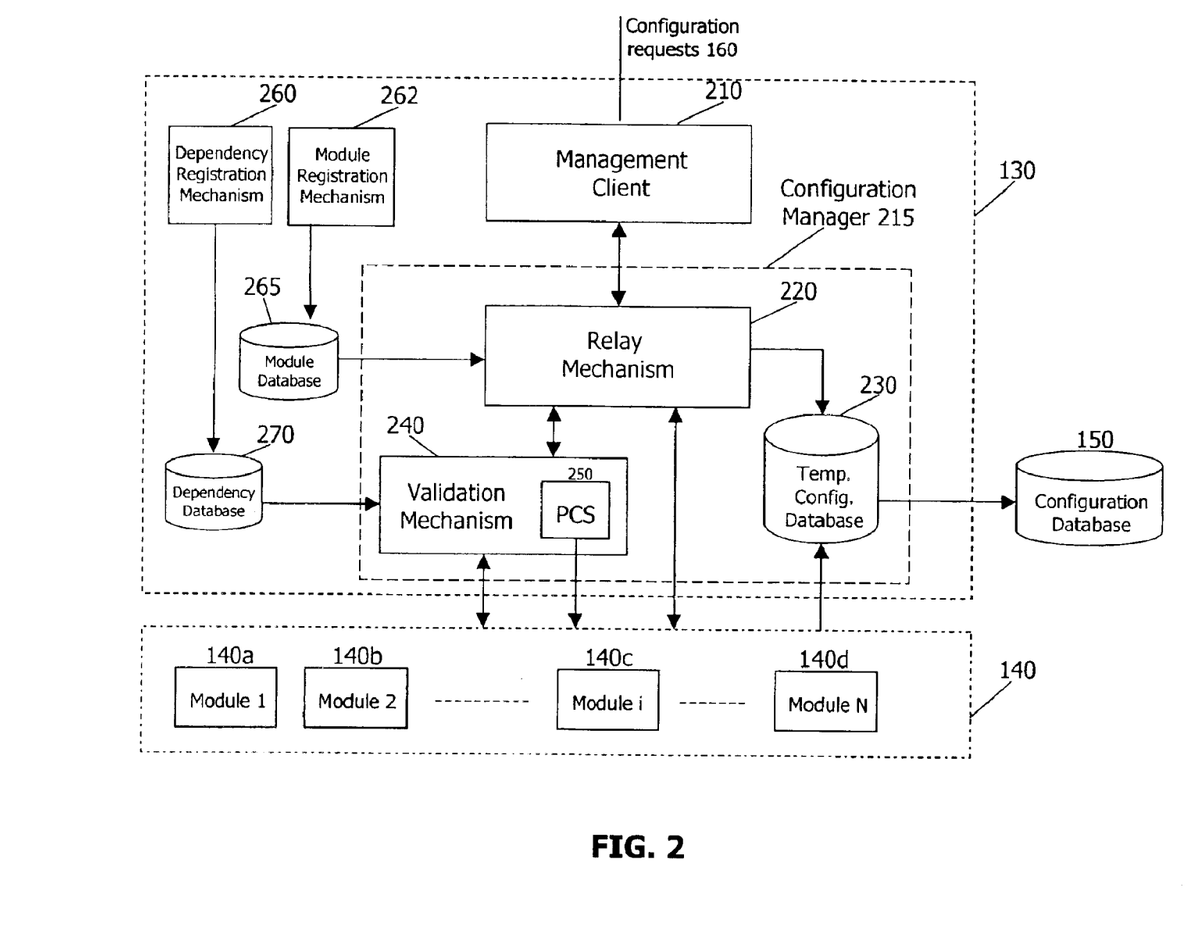
FIG. 2 is a high level functional block diagram of an embodiment of the present invention, in which a consistency assurance mechanism interacts with embedded modules and a configuration database.

FIG. 2 illustrates an embodiment of the present invention, which describes how the consistency assurance mechanism 130 interacts with the embedded modules 140 and the configuration database. In FIG. 2, the consistency assurance mechanism 130 comprises a management client 210, a configuration manager 215, a module registration mechanism 262 connected to a module database 265, and a dependency registration mechanism 260 connected to a dependency database 270.

The management client 210 receives the configuration requests 160 from outside of the embedded system 110. For example, it may receive SNMP packets from an outside SNMP management station. The received configuration requests 160 correspond to a transaction that executes a set of configuration parameter changes. The management client 210 may also receive commands from a console terminal requesting changes to be made to the configuration stored in the configuration database.

The management client 210 controls parameter configuration via the configuration manager 215 by requesting appropriate embedded modules to execute the configuration. To enable the configuration manager 215 to access the embedded modules 140, the embedded modules may be registered through the module registration mechanism 262 and the registration information may be stored in the module database 265.

In FIG. 2, the configuration manager 215 comprises a relay mechanism 220, a temporary configuration database 230, and a validation mechanism 240 with a parameter change signaling mechanism (PCS) 250. The temporary configuration database 230 is created whenever the management client 210 informs the configuration manager 215 that a new transaction starts. The temporary configuration database 230 is first created as a copy of the configuration database 150 and then to be used to host the changes made to the configuration parameters by the appropriate modules based on the received configuration requests 160. This yields a new configuration for the embedded system 110, which is temporarily stored in the temporary configuration database 230. Such a new configuration may not be transferred (or copied) back to the configuration database 150 until they are validated by the validation mechanism 240 as consistent.

The relay mechanism 220 controls different acts performed by the configuration manager 215. For example, it may trigger an appropriate embedded module to perform a parameter configuration based on a configuration request sent by the management client 210. It may also activate the validation mechanism 240 to perform consistency checking. When the configuration parameters in the temporary configuration database are validated (consistent), the relay mechanism 220 may also activate the transfer of the validated configuration parameters from the temporary configuration database 230 to the configuration database 150.

When the management client 210 sends a parameter configuration request to the configuration manager 215, the relay mechanism 220 receives the request and identifies the appropriate module before relaying the request to the identified module. The appropriate module may be identified based on the registered modules stored in the module database 265. For example, if a parameter configuration request instructs to set parameter A in module X to 2, the relay mechanism 220 analyzes the request and verifies that module A is registered by looking up the module database 265.

Figure 3:
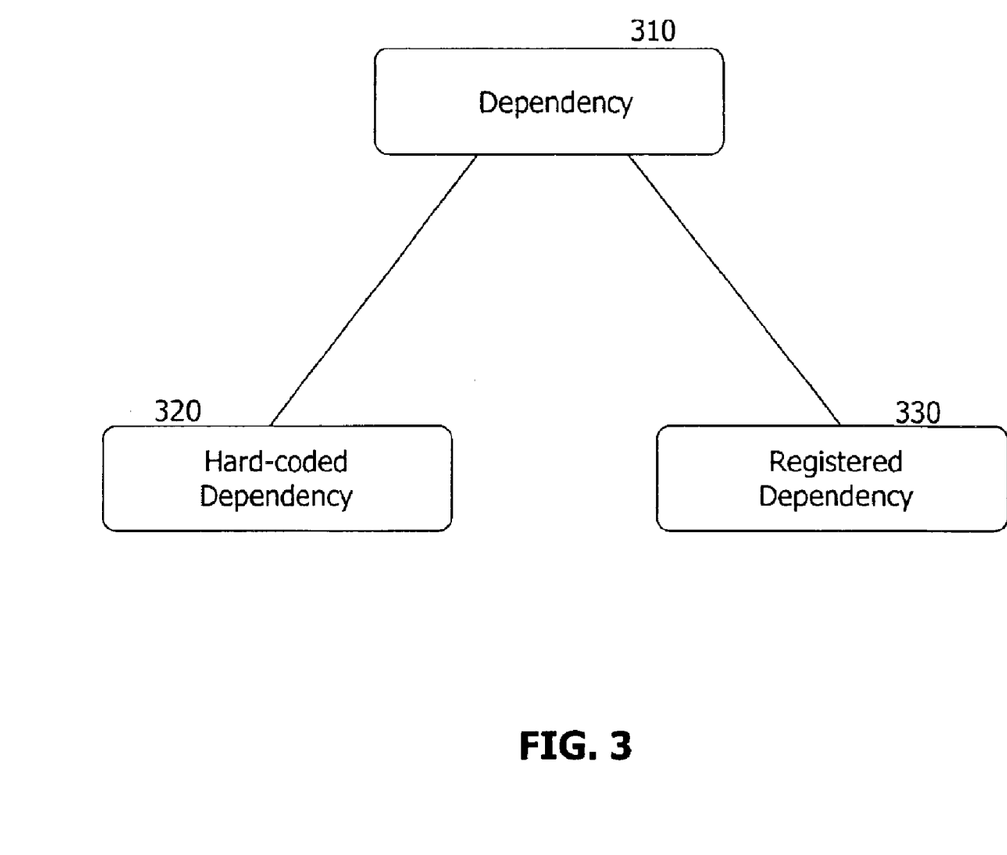
FIG. 3 shows two exemplary ways of defining a dependency relationship.

The configuration manager 215 enforces consistent parameter configuration via the validation mechanism 240. Configuration consistency may be defined with respect to certain dependency relationships among different configuration parameters. There may be different ways to define such dependency relationships. FIG. 3 illustrates two exemplary ways to define a dependency 310. One is to define through a hard coded dependency 320 and the other is to define a registered dependency 330. The former (320) refers to a dependency relationship that is hard coded in the modules involved. A hard coded dependency may involve the dependency among different configuration parameters within the same module. For example, if the value of parameter B in module X depends on the value of parameter A in module X (e.g., A=2, then B=3), parameter A and B form a dependency relationship. The dependency between A and B may be hard coded in module X and the consistency may be enforced through both module X and the configuration manager. This is discussed later in reference to FIG. 5 and FIG. 6.

A dependency may also be defined explicitly by registering the dependency relationship 330 with the configuration manager 215 via the dependency registration mechanism 260. Such registered dependency relationships are stored in the dependency database 270. A registered dependency may involve the dependency among different configuration parameters across modules. A registered dependency is therefore usually defined with respect to two modules, one being independent and the other being dependent. For example, if the value of parameter B in module Y depends on the value of parameter A in module X, module Y is defined as the dependent module. Once the dependency relationship is registered and stored, a change to the value of parameter A in module X will trigger the PCS 250 in the validation mechanism 240 to notify module Y to perform a change to parameter B accordingly so that the dependency is maintained properly. Optionally, module Y may refuse to change the value of B. In this case, the change made to parameter A may also be rejected to maintain the consistency. For this reason, both A and B may have to be changed within a single transaction.

Figure 4:
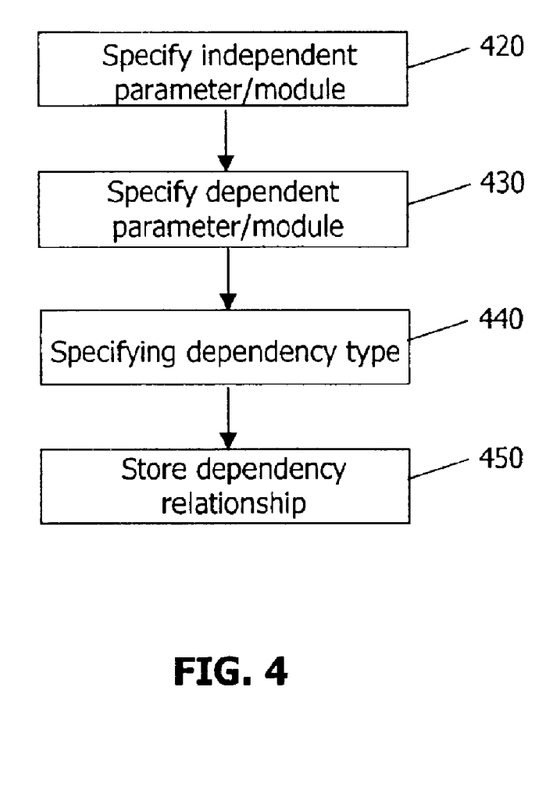
FIG. 4 is an exemplary flowchart of a registration process, in which a dependency relationship between two embedded modules is registered.

An exemplary dependency registration process is described in FIG. 4. An independent parameter (e.g., parameter A) in the associated independent module (e.g., module X) is first specified and registered at act 420. Then the corresponding dependent parameter (e.g., parameter B) in a dependent module (e.g., module Y) is specified and registered at act 430. The independent parameter/module and the dependent parameter/module form a dependency relationship. The type of the relationship may be specified further at act 440. For example, when A is changed to 2, module Y should be notified. The registered dependency relationship is then stored in the dependency database at act 450.

Referring back to FIG. 2, the validation mechanism 240 may enforce the consistency of configuration parameters by enforcing the dependency relationships specified among different configuration parameters of embedded modules. To enforce a registered dependency relationship, the PCS 250 associated with the validation mechanism 240 may notify an embedded module about a change to a configuration parameter, which a different configuration parameter in a different embedded module depends on. For example, assume a configuration parameter B in embedded module Y depends on a configuration parameter A in embedded module X (e.g., if A=2, then B=3. If A=3, B=5.) and such a dependency relationship is registered with the dependency registration mechanism 260 and stored in the dependency database 270. When the value of parameter A in module X is changed from value 2 to value 3, the validation mechanism 240 notifies module Y to change its value accordingly. That is, the validation mechanism 240 monitors the changes made to configuration parameters, identifies the dependents of these parameters, and informs the dependent modules to make changes accordingly so that the consistency (or the dependency relationship) is maintained.

When an embedded module is notified of a change and is requested to change the value of a dependent configuration parameter, the embedded module may determine how to make the change to the dependent configuration parameter. That is, the task performed by the validation mechanism 240 may be limited to merely informing the dependent module to make a change to a particular parameter (but not how to change). It may also be possible to implement the validation mechanism 240 in such a way that it controls directly how to change the value of a dependent configuration parameter.

When an embedded module sets the value of a configuration parameter, it may return a status code to the validation mechanism 240. Different values of the returned status code may represent different outcomes. For example, the status code may be "OK", representing the outcome that the request is performed without any problem. The status code may also be "ERROR", indicating that an error has occurred during the execution of a configuration request. An error may be due to an inconsistent parameter configuration. For example, if a configuration parameter is only allowed to be set to value 2 or 3 but a configuration request instructs the underlying module to set the parameter value to 5. Status code may represent an message that informs the validation mechanism 240 that the underlying module has a hard coded dependency relationship that can not be verified as consistent at the time being.

Depending on the status code returned from an underlying module, the validation mechanism 240 may react accordingly. For example, an error code may be forwarded back to the relay mechanism 220 and subsequently sent to the management client so that an undo operation may be performed. An undo operation may be implemented by simply ignoring all the parameter configurations performed in the temporary configuration database up to this point. That is, the temporary configuration database 230 will not be copied to the configuration database 150. This yields an identical effect as undo.

Whenever the return status code reports an "OK" status, the validation mechanism 240 may automatically proceed to enforce registered dependency relationships. The validation mechanism 240 may carry out an iterative validation process to enforce a registered dependency. For example, if parameter B in module Y depends on parameter A in module X and when a request to module X is made to change parameter A, the validation mechanism 240 identifies the corresponding registered dependency from the dependency database 270 and notifies module Y to revise the value of parameter B. The notification may be triggered by an "OK" status code returned by module X after module X changes the value of parameter A. In this way, the registered dependencies are automatically enforced.

When an "OK" status is received at the end of an iterative validation process, the validation mechanism 240 may inform the relay mechanism 220 that the validation is complete. In this case, the relay mechanism notifies the management client 210 of the completion of a request. The management client 210 may then issue next request to the configuration manager 215.

When the status code indicates using, for example, "REPEAT CALL", that there exists a hard coded dependency relationship with respect to the current request, the validation mechanism 240 may postpone the validation process until the end of the transaction. For example, assume parameters A and B in module X have a dependency relationship (A=2, then B=3. A=3, then B=5) hard coded in module X. When the management client 210 first sends a request, via the configuration manager 215, to module X to change value of A to 3, the return status code from module X after A is set to 3 may be a "REPEAT CALL". The "REPEAT CALL" indicates that the consistency can not be checked at this point (because module X does not know whether there will be a future request in the same transaction that instructs module X to change the value of B to 5). In this case, the validation mechanism 240 may not start the validation after all the configuration requests in the same transaction have been processed. But the validation mechanism 240 records these outstanding requests whose validity need to be checked at the end of the transaction.

When the management client 210 detects that all the configuration requests 160 are processed in the temporary configuration database 230, it sends a command to the configuration manager 215 to perform a consistency check. The relay mechanism 220 activates the validation mechanism 240. The validation mechanism 240 carries out the consistency check on all the outstanding requests and informs the management client 210, via the relay mechanism 220, the outcome. If the outcome represents a consistent configuration, the management client 210 sends command to the relay mechanism to commit the configuration. To commit the configuration, the configuration parameters stored in the temporary database 230 are copied or transferred to the configuration database 150. If the outcome indicates an inconsistent configuration, the management client 210 sends an undo command to the relay mechanism 220. To undo the configuration, the configuration parameters stored in the temporary database 230 are ignored.

Figure 5:
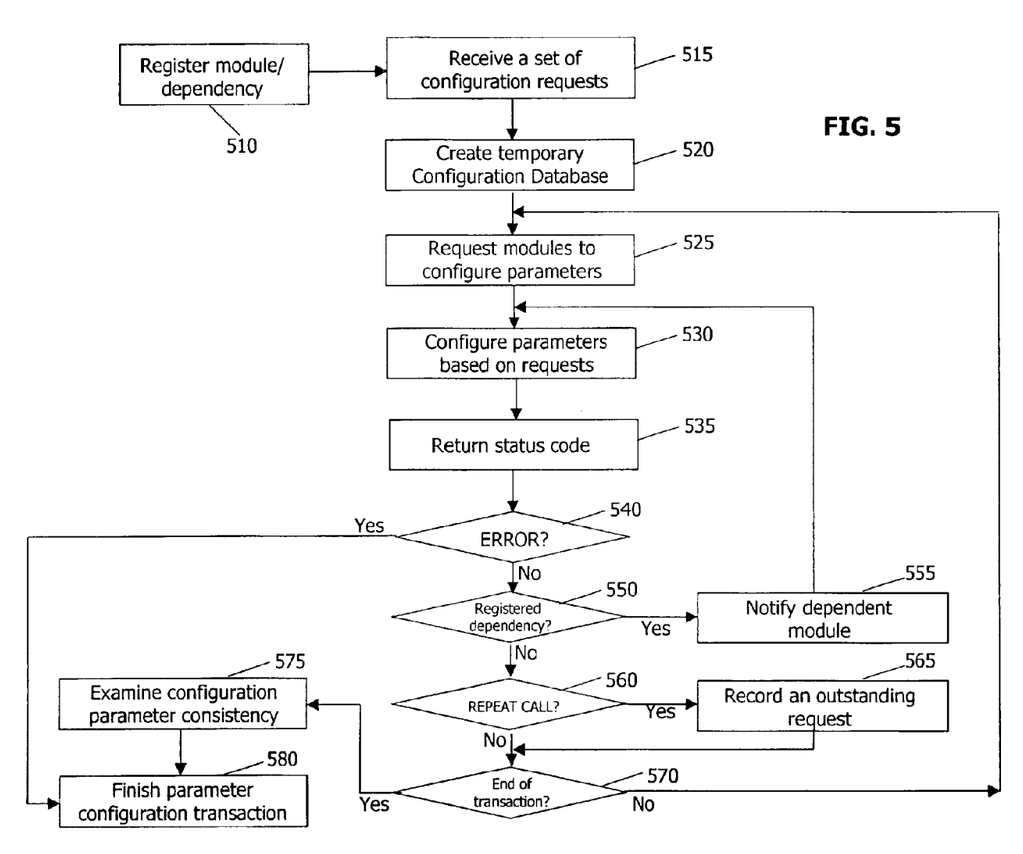
FIG. 5 is an exemplary flowchart of a process, in which consistent parameter configuration is performed.

FIG. 5 is an exemplary flowchart of a process, in which consistent parameter configuration is performed. Prior to the execution of consistent parameter configuration, embedded modules 140 and some of the dependency relationships are registered at act 510. This may be performed prior to the deployment of the embedded system 110. To configure the embedded system 110, a set of configuration requests is received at act 515 and these configuration requests correspond to one single transaction. Upon receiving the configuration requests, the management client 210 informs the configuration manager to start a new transaction. The configuration manager 215 creates, at act 520, the temporary configuration database 230. The management client 210 then sends a request to the configuration manager 215 and the configuration manager 215 relay the request, at act 525, to an appropriate embedded module to perform the requested parameter configuration. The appropriate module executes, at act 530, the requested configuration and returns a status code at act 535. The updates to the current configuration are performed first in the temporary configuration database 230. The configuration manager 215 examines the return status code at act 540 to see whether it is an error. If it is an error code, the process proceeds to finish the transaction (will be described in reference to FIG. 7). When the status code does not indicate an error, the configuration manager 215 proceeds to check the consistency against registered dependencies.

If there is any registered dependency associated with the current configuration request, determined at act 550 by, for example, consulting with the dependency database 270, the validation mechanism 240 notifies the dependent module that there has been a change made to its independent parameter in the independent module. For example, if parameter B in module Y depends on parameter A in module X, the configuration manager 215 notifies module Y if the current configuration request involves a change to the value of parameter A in module X. Once notified, module Y may configure its dependent parameter B at act 530. As described earlier, module Y may refuse to configure parameter B.

The process of enforcing a registered dependency relationship may be iterative. For instance, there may be another parameter C in module Z that is dependent on parameter B of module Y. In this case, the validation mechanism 240 further notifies module Z to change parameter C. The process loops through the acts between act 530 and 555 until all the registered nesting dependencies associated with the current configuration request are enforced.

The returned status code may also indicate that there is a hard coded dependency. For example, the status code may be "REPEAT CALL", determined at act 560, indicating that at least some dependent parameter has not been accordingly configured. In this case, the consistency associated with the hard coded dependency relationship can not be checked until all the configuration requests in a transaction are processed. In the exemplary flowchart shown in FIG. 5, the validation mechanism 240 postpones such consistency check before the end of the transaction and record current configuration request as an outstanding request at act 565. To allow the transaction to move forward, the validation mechanism 240 may also simply inform the management client 210 an "OK" status at this point so that the management client 210 will proceed to send the remaining configuration requests. The acts between 525 and 570 repeat until the end of the transaction.

At the end of the transaction, determined at act 570, the management client 210 ends the transaction and request the validation mechanism 240 to proceed to check, at act 575, the consistency of the configurations performed in the transaction. The details of the consistency check are discussed later with reference to FIG. 6. After the consistency check, the configuration manager 215 informs the management client 210 about the status of the check and the management client 210 ends the transaction at act 580 based on the consistency check outcome.

Figure 6:
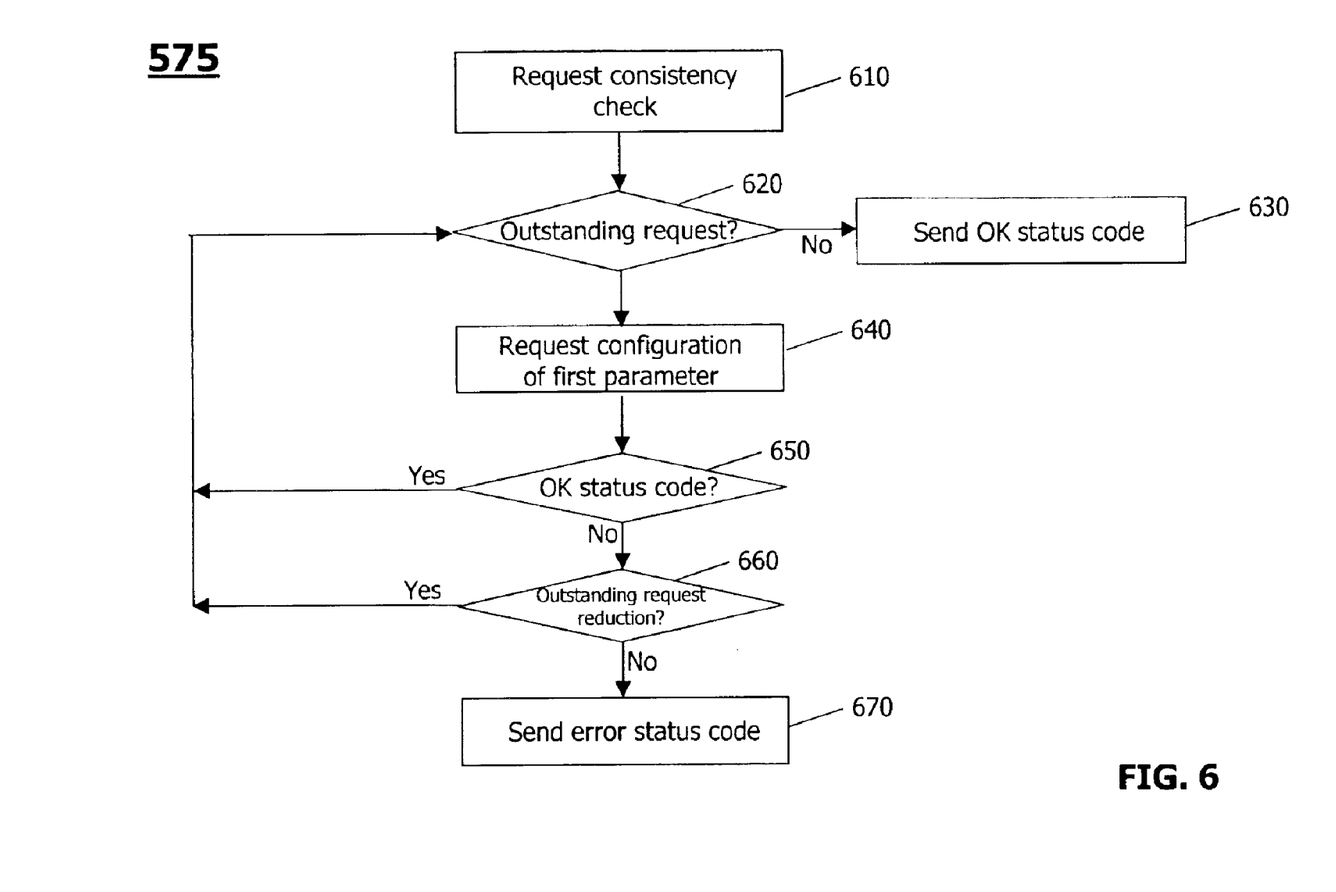
FIG. 6 is an exemplary flowchart of a process, in which consistency check is performed.

As discussed earlier, the configuration manager 215 may postpone the consistency check associated with hard coded dependencies until all the configuration requests in a transaction have been processed. FIG. 6 is an exemplary flowchart that describes the process of consistency checking at the end of a transaction. In FIG. 6, the management client 210 sends a request at the end of a transaction, at act 610, to the configuration manager 215 to perform consistency check. Since the consistency defined through registered dependencies has been validated or enforced while the configuration requests are processed, the consistency check at the end of a transaction may involve only validating the outstanding hard coded dependencies. What needs to be validated at this point includes the outstanding requests recorded by the configuration manager 215. If there is no outstanding request, determined at act 620, the configuration manager 215 may simply return an "OK" status at act 630 to the management client 210 as the outcome of consistency check.

If there is any outstanding request, the relay mechanism 220 triggers the validation mechanism 240 to start a consistency check. For each outstanding request, the validation mechanism 240 sends, at act 640, the original configuration request to the associated module. The original configuration request instructs the associated module to change the independent parameter in the hard coded dependency. For example, assume parameter B depends on parameter A in module X. When an original request to configure parameter A in module X is made, module X sets the value of parameter A and then return a status code "REPEAT CALL" if the value of parameter B is not consistent with the new value of parameter A. This is to indicate that it is not possible at this point to validate the consistency. The validation mechanism 240 postpones the consistency check and records the original request to change parameter A in module X as an outstanding request. When the consistency check is performed at the end of the underlying transaction, the validation mechanism 240 revisits the original request and requests, for the second time, module X to configure parameter A. At this point, if there has been a request in the same transaction made to module X to configure parameter B (after the original request to configure A in module X and prior to the end of transaction), the configuration may now be consistent and module X will return an OK status code. If not, module X will again return a "REPEAT CALL" status code.

When a module with a hard coded dependency returns an "OK" status code in the second round, determined at act 650, the configuration manager 215 proceed to handle the next outstanding request (back to act 620). If the module returns another "REPEAT CALL" status code for the second time, the validation mechanism 240 examines whether the number of outstanding requests is decreased. If the number of outstanding request is not decreased, determined at act 660, the validation mechanism 240 sends an "ERROR" back to the management client 210 to indicate a failure in consistency check. If the number of outstanding requests is reducing, the validation mechanism 240 proceeds to handle the next outstanding request (back to act 620).

Figure 7:
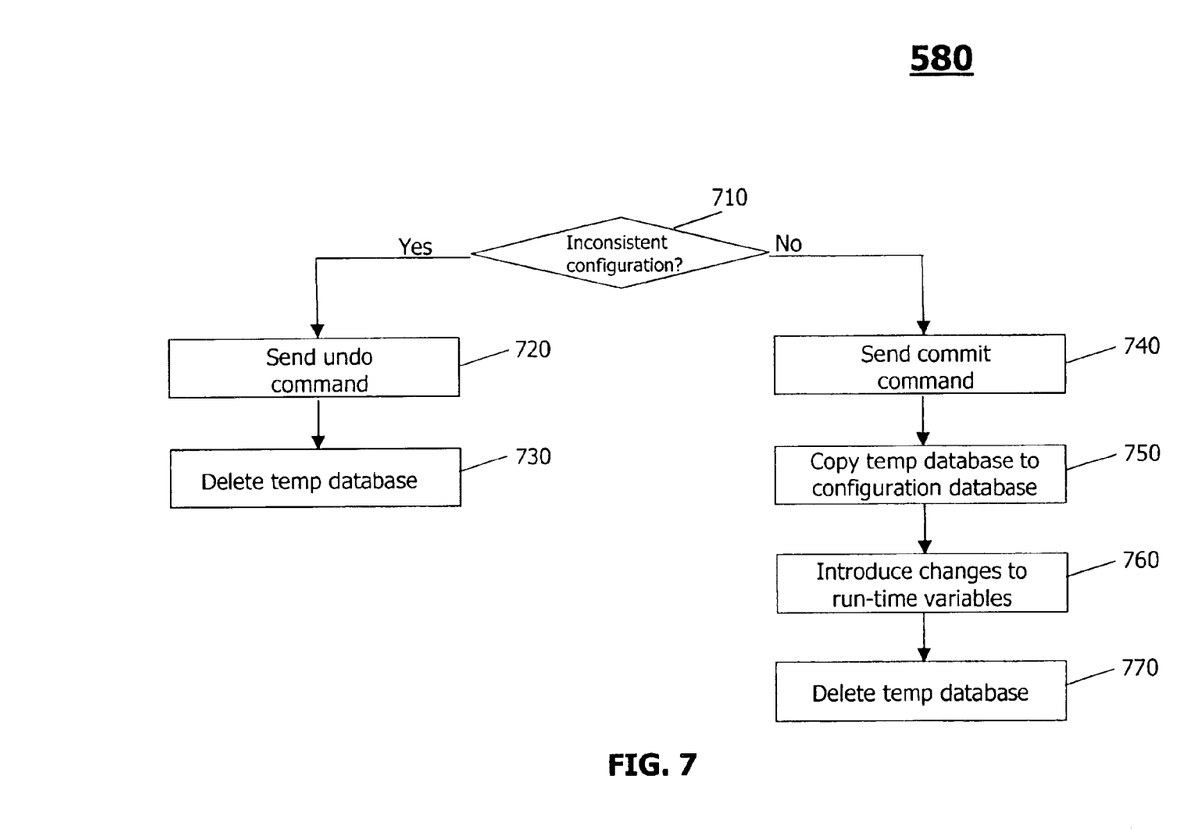
FIG. 7 is an exemplary flowchart of a process to properly end a transaction according to consistency check outcome.

FIG. 7 is an exemplary flowchart of a process, in which the management client 210 reacts to different outcomes of a consistent check process and completes a transaction accordingly. There are two possible outcomes from consistency check: consistent configuration and inconsistent configuration. When the outcome indicates an inconsistent configuration, determined at act 710, the management client 210 sends an "UNDO" command at act 720 to the configuration manager 215. Up on receiving the "UNDO" command, the configuration manager 215 deletes, at act 730, the temporary configuration database 230 without changing the current configuration stored in the configuration database 150.

When the management client 210 receives an outcome that indicates a consistent configuration after the consistency check, it sends a "COMMIT" command at act 740 to the configuration manager 215. Up on receiving the "COMMIT" command, the configuration manager 215 copy, at act 750, the new configuration stored in the temporary configuration database 230 to the configuration database 150 to generate a new current configuration of the embedded system 110. Based on the new current configuration, corresponding changes are introduced, at act 760, to run-time variables. The temporary configuration database 230 is then deleted at act 770.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A system comprising:
   at least one embedded module in an embedded system; and
   a consistent parameter configuration mechanism in said embedded system, said consistent parameter configuration mechanism communicating with said at least one embedded module to manage configuration parameters in a consistent fashion,
   wherein configuration parameters are configurable parameters associated with at least one embedded module,
   wherein said consistent parameter configuration mechanism comprises:
      a configuration database to store a set of configuration parameters of said embedded system, said set of configuration parameters having run-time counterpart variables in said at least one embedded module, said configuration database additionally to determine the behavior of said at least one embedded module and said embedded system, and
      a consistency assurance mechanism to ensure that said set of configuration parameters stored in said configuration database is consistent,
   wherein said consistent parameter configuration mechanism maintains configuration parameter dependency relationships associated with said at least one embedded module,
   wherein said consistency assurance mechanism comprises:
      a management client to receive a set of configuration requests to configure at least one configuration parameter from said set of configuration parameters and to manage the execution of said set of configuration requests, and
      a configuration manager to manage the consistent configuration of said at least one configuration parameter according to said Set of configuration requests, said configuration manager communicating with both said management client and said at least one embedded module to execute said set of configuration requests in a consistent fashion, and
   wherein said configuration manager comprises:
      a temporary configuration database to store at least some of said configuration parameters that are set by said at least one embedded module according to said configuration requests;
      a validation mechanism to perform consistency checking; and
      a relay mechanism to coordinate execution of parameter configuration based on said configuration requests, validation of configuration consistency, undo operation when a configuration is found not consistent, and commitment to a consistent configuration after a validation of a consistent configuration.

2. The system according to claim 1, wherein said validation mechanism further comprises a parameter change signaling mechanism to notify an embedded module about a change in a configuration parameter according to a dependency relationship.

3. The system according to claim 1, said consistent parameter configuration mechanism further comprising:
   a module registration mechanism to register said at least one embedded module;
   a module database to record the modules that are registered through said module registration mechanism;
   a dependency registration mechanism to register dependency relationships; and
   a dependency database to store said dependency relationships registered through the dependency registration mechanism.

4. A method for consistent parameter configuration, comprising:
   receiving, by a management client, a set of configuration requests, said set of configuration requests corresponding to a transaction;
   creating, by a configuration manager, a temporary configuration database after said management client notifies the configuration manager the start of the transaction;
   requesting an appropriate embedded module to perform a parameter configuration according to one of the configuration requests;
   performing, by said appropriate embedded module, said parameter configuration, the appropriate module changing the value of a first parameter in said temporary configuration database and generating a first status code;
   returning said first status code to the configuration manager,
   undoing said parameter configuration if the first status code indicates an error;
   recording said one of the configuration requests as an outstanding request if the first status code indicates that there is a hard coded dependency associated with the parameter configuration and defined based on said first parameter; and
   enforcing, if the first status code is not an error, a registered dependency that is identified to associate with the parameter configuration and defined based on said first parameter.

5. The method according to claim 4, wherein said enforcing comprises:
   identifying a dependent embedded module which contains a second parameter that depends on said first parameter according to said registered dependency; and
   notifying said dependent embedded module to verify whether said first parameter remains consistent with the said second parameter and to optionally configure the second parameter.

6. The method according to claim 4, further comprising:
   examining, by said configuration manager, configuration consistency at the end of said transaction to generate a second status code; and
   finishing said transaction according to said second status code.

7. The method according to claim 4, further comprising:
   registering, by a module registration mechanism prior to said receiving, said at least one embedded module; and
   recording the at least one embedded module, registered through said registering, in a module database.

8. The method according to claim 5, further comprising:
   registering, by a dependency registration mechanism prior to the receiving, a dependency relationship that is used in said examining to determine the consistency; and
   storing the dependency relationship as a registered dependency relationship in a dependency database.

9. The method according to claim 8, wherein said registering includes:
   specifying an independent parameter associated with an independent embedded module, said independent parameter being configurable in said independent embedded module, said independent embedded module being one of the at least one embedded module; and
   specifying a dependent parameter associated with a dependent embedded module, said dependent parameter being configurable in said dependent embedded module, said independent embedded module being one of the at least one embedded module, the independent embedded module and the dependent embedded module forming said registered dependency that triggers a parameter configuration to be performed on the dependent parameter whenever there is a change made to the independent parameter.

10. The method according to claim 6, wherein said examining comprises:
    determining, by said configuration manager, whether there is an outstanding request recorded by said recording;
    sending said second status code indicating a consistent configuration if no outstanding request is recorded;
    requesting an embedded module to perform a second parameter configuration based on said outstanding request that defines the embedded module and the parameter to be configured through said parameter configuration;
    receiving a third status code specifying the status of the second parameter configuration;
    determining whether the number of outstanding request is reduced; and
    sending said second status code indicating an inconsistent configuration if the number of outstanding request is not reduced.

11. The method according to claim 6, wherein said finishing comprises:
    determining whether said second status code indicates an inconsistent configuration;
    undoing said transaction if said second status code indicates an inconsistent configuration; and
    committing said transaction if said second status code indicates a consistent configuration.

12. The method according to claim 11, wherein said undoing comprises
    sending a first command from said management client to said configuration manager;
    deleting, by said configuration manager, said temporary configuration database based on said first command.

13. The method according to claim 11, wherein said committing comprises:
    sending a second command from said management client to said configuration manager;
    copying the content from said temporary configuration database to a configuration database based on said second command;
    introducing changes to run-time variables based on the configuration database, and deleting said temporary configuration database after said copying.

14. A computer-readable medium encoded with a program for consistent parameter configuration, said program comprising:

receiving, by a management client, a set of configuration requests, said set of configuration requests corresponding to a transaction;

creating, by a configuration manager, a temporary configuration database after said management client notifies the configuration manager the start of the transaction;

requesting an appropriate embedded module to perform a parameter configuration according to one of the configuration requests;

performing, by said appropriate embedded module, said parameter, said appropriate module changing the value of a first parameter in said temporary configuration database and generating a first status code;

returning said first status code to the configuration manager, undoing said parameter configuration if the first status code indicates an error;

recording said one of the configuration requests as an outstanding request if the first status code indicates that there is a hard coded dependency associated with the parameter configuration and defined based on said first parameter; and enforcing, if the first status code is not an error, a registered dependency that is identified to associate with the parameter configuration and defined based on said first parameter.

15. The medium according to claim 14, wherein said enforcing comprises:

identifying a dependent embedded module which contains a second parameter that depends on said first parameter according to said registered dependency; and notifying said dependent embedded module to configure the second parameter.

16. The medium according to claim 14, said program further comprising:

examining, by said configuration manager, configuration consistency at the end of said transaction to generate a second status code; and finishing said transaction according to said second status code.

17. The medium according to claim 14, said program further comprising:

registering, by a module registration mechanism prior to said receiving, said at least one embedded module; and recording the at least one embedded module, registered through said registering, in a module database.

18. The medium according to claim 15, said program further comprising:

registering, by a dependency registration mechanism prior to the receiving, a dependency relationship that is used in said examining to determine the consistency; and storing the dependency relationship as a registered dependency relationship in a dependency database.

19. The medium according to claim 18, wherein said registering includes:

specifying an independent parameter associated with an independent embedded module, said independent parameter being configurable in said independent embedded module, said independent embedded module being one of the at least one embedded module; and specifying a dependent parameter associated with a dependent embedded module, said dependent parameter being configurable in said dependent embedded module, said independent embedded module being one of the at least one embedded module, the independent embedded module and the dependent embedded module forming said registered dependency that triggers a parameter configuration to be performed on the dependent parameter whenever there is a change made to the independent parameter.

20. The medium according to claim 16, wherein said examining comprises:

determining, by said configuration manager, whether there is an outstanding request recorded by said recording;

sending said second status code indicating a consistent configuration if no outstanding request is recorded;

requesting an embedded module to perform a second parameter configuration based on said outstanding request that defines the embedded module and the parameter to be configured through said parameter configuration;

receiving a third status code specifying the status of the second parameter configuration;

determining whether the number of outstanding request is reduced; and sending said second status code indicating an inconsistent configuration if the number of outstanding request is not reduced.

21. The medium according to claim 16, wherein said finishing comprises:

determining whether said second status code indicates an inconsistent configuration;

undoing said transaction if said second status code indicates an inconsistent configuration; and committing said transaction if said second status code indicates a consistent configuration.

22. The medium according to claim 21, wherein said undoing comprises sending a first command from said management client to said configuration manager;

deleting, by said configuration manager, said temporary configuration database based on said first command.

23. The medium according to claim 21, wherein said committing comprises:

sending a second command from said management client to said configuration manager;

copying the content from said temporary configuration database to a configuration database based on said second command;

introducing changes to run-time variables based on the configuration database, and deleting said temporary configuration database after said copying.

* * * * *